(12) United States Patent
Cooley et al.

(10) Patent No.: US 8,672,552 B2
(45) Date of Patent: Mar. 18, 2014

(54) BEARING ASSEMBLIES

(75) Inventors: Craig H. Cooley, Saratoga Springs, UT (US); Timothy N. Sexton, Genola, UT (US)

(73) Assignee: US Synthetic Corporation, Orem, UT (US)

( * ) Notice: Subject to any disclaimer, the term of this patent is extended or adjusted under 35 U.S.C. 154(b) by 214 days.

(21) Appl. No.: 13/183,686

(22) Filed: Jul. 15, 2011

(65) Prior Publication Data

US 2013/0016935 A1      Jan. 17, 2013

(51) Int. Cl.
*F16C 33/12* (2006.01)

(52) U.S. Cl.
USPC .......................................... 384/420; 384/284

(58) Field of Classification Search
USPC .......................................... 384/420, 282–285
See application file for complete search history.

(56) References Cited

U.S. PATENT DOCUMENTS

| | | | |
|---|---|---|---|
| 4,892,420 A | 1/1990 | Kruger | |
| 7,866,418 B2 | 1/2011 | Bertagnolli et al. | |
| 7,870,913 B1 | 1/2011 | Sexton et al. | |

FOREIGN PATENT DOCUMENTS

| EP | 2426050 | 3/2012 |
|---|---|---|
| WO | WO 2009/015338 | 1/2009 |

OTHER PUBLICATIONS

U.S. Appl. No. 11/545,929, filed Oct. 10, 2006, Bertagnolli.
U.S. Appl. No. 12/761,535, filed Apr. 16, 2010, Scott et al.
International Search Report and Written Opinion from International Application No. PCT/US2012/046030 mailed Jan. 28, 2013.

*Primary Examiner* — Thomas R Hannon
(74) *Attorney, Agent, or Firm* — Dorsey & Whitney LLP

(57) ABSTRACT

In an embodiment, a bearing assembly includes superhard bearing elements distributed circumferentially about an axis. At least one of the superhard bearing elements may include a first arcuate end portion, a second arcuate end portion, a first substantially planar face, a second substantially planar face, and a bearing surface. The first and second arcuate end portions may be generally opposite each other. The first substantially planar face may extend between the first and second arcuate end portions. The second substantially planar face may be generally opposite the first substantially planar face. The first substantially planar face may have a length greater than a length of the second substantially planar face. The bearing surface may extend between the first arcuate end portion, the second arcuate end portion, the first substantially planar face, and the second substantially planar face. The bearing assembly includes a support ring that carries the superhard bearing elements.

13 Claims, 16 Drawing Sheets

BEARING ASSEMBLIES

BACKGROUND

Subterranean drilling systems that employ downhole drilling motors are commonly used for drilling boreholes in the earth for oil and gas exploration. Subterranean drilling systems typically include a housing enclosing a downhole drilling motor operably connected to an output shaft. One or more thrust-bearing apparatuses may also be operably coupled to the downhole drilling motor for carrying thrust loads generated during drilling operations. A rotary drill bit may also be connected to the output shaft and be configured to engage a subterranean formation and drill a borehole.

Each bearing apparatus may include a stator that does not rotate and a rotor that is attached to the output shaft and rotates with the output shaft. The stator and rotor may each include a plurality of superhard bearing elements or inserts. Each superhard bearing element may be fabricated from a polycrystalline diamond compact ("PDC") that provides a bearing surface that bears against other bearing surfaces during use.

In a conventional PDC bearing apparatus, a bearing assembly may include a support ring that may be configured to accept a number of superhard bearing elements. The superhard bearing elements may be made from a polycrystalline diamond layer formed on a cemented tungsten carbide substrate. These superhard bearing elements are commonly manufactured by machining cylindrical PDCs. The manufacture of superhard bearing elements from PDCs traditionally requires complex and repetitive cutting and/or grinding, making the manufacturing process expensive and time consuming. Moreover, common manufacturing processes produce a single superhard bearing element per PDC, wasting a significant portion of the PDC and ultimately increasing the cost of superhard bearing elements for users.

Therefore, manufacturers and users of bearing apparatuses continue to seek improved bearing apparatus designs and manufacturing techniques.

SUMMARY

Embodiments of the invention relate to bearing assemblies and apparatuses that include superhard bearing elements having geometries tailored for streamlined manufacturing and efficient positioning thereof in the bearing assemblies and apparatuses. The disclosed bearing assemblies and apparatuses may be used in a variety of applications such as drilling equipment, machining equipment, bearing apparatuses, and other articles.

In an embodiment, a bearing assembly includes a plurality of superhard bearing elements distributed circumferentially about an axis. At least one of the superhard bearing elements may include a first arcuate end portion, a second arcuate end portion, a first substantially planar face, a second substantially planar face, and a bearing surface. The second arcuate end portion may be generally opposite the first arcuate end potion. The first substantially planar face may extend between the first arcuate end portion and the second arcuate end portion. The second substantially planar face may be generally opposite the first substantially planar face. The first substantially planar face may have a length greater than a length of the second substantially planar face. The bearing surface may extend between the first arcuate end portion, the second arcuate end portion, the first substantially planar face, and the second substantially planar face. The bearing assembly further includes a support ring that carries the plurality of superhard bearing elements.

In an embodiment, a bearing apparatus may include a first bearing assembly including a first plurality of superhard bearing elements and a support ring that carries the first plurality of superhard bearing elements. At least one of the first plurality of superhard bearing elements may have a first arcuate end portion, a second arcuate end portion, a first substantially planar face, a second substantially planar face, and a first bearing surface. The second arcuate end portion may be generally opposite the first arcuate end portion. The first substantially planar face may extend between the first arcuate end portion and the second arcuate end portion. The second substantially planar face may be generally opposite the first substantially planar face. The first substantially planar face may have a length greater than a length of the second substantially planar face. The first bearing surface may extend between the first arcuate end portion, the second arcuate end portion, the first substantially planar face, and the second substantially planar face. The bearing apparatus may also include a second bearing assembly including a second plurality of superhard bearing elements generally opposed to the first plurality of superhard bearing elements of the first bearing assembly. The second bearing assembly may also include a second support ring that carries the second plurality of superhard bearing elements.

In an embodiment, a method of manufacturing a plurality of superhard bearing elements from a blank insert having a longitudinal axis and a lateral dimension including a first end point, a midpoint, and a second end point, may include making a first cut substantially parallel to the longitudinal axis of the blank insert at a predetermined distance from the midpoint of the lateral dimension between the first end point of the lateral dimension and the midpoint of the lateral dimension. A second cut may be made to produce a first superhard bearing element from the blank insert. The second cut may be substantially parallel to the longitudinal axis of the blank substantially at the midpoint of the lateral dimension. A third cut may be made to produce a second superhard bearing element from the blank insert. The third cut may be substantially parallel to the longitudinal axis of the blank insert at the predetermined distance from the midpoint of the lateral dimension between the midpoint of the lateral dimension and the second end point of the lateral dimension.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

Embodiments of the invention relate to bearing assemblies and apparatuses that include superhard bearing elements having geometries tailored for streamlined manufacturing and efficient positioning thereof in the bearing assemblies and apparatuses. The disclosed bearing assemblies and apparatuses may be used in a variety of applications such as drilling equipment, machining equipment, bearing apparatuses, and other articles.

Figure 1A:
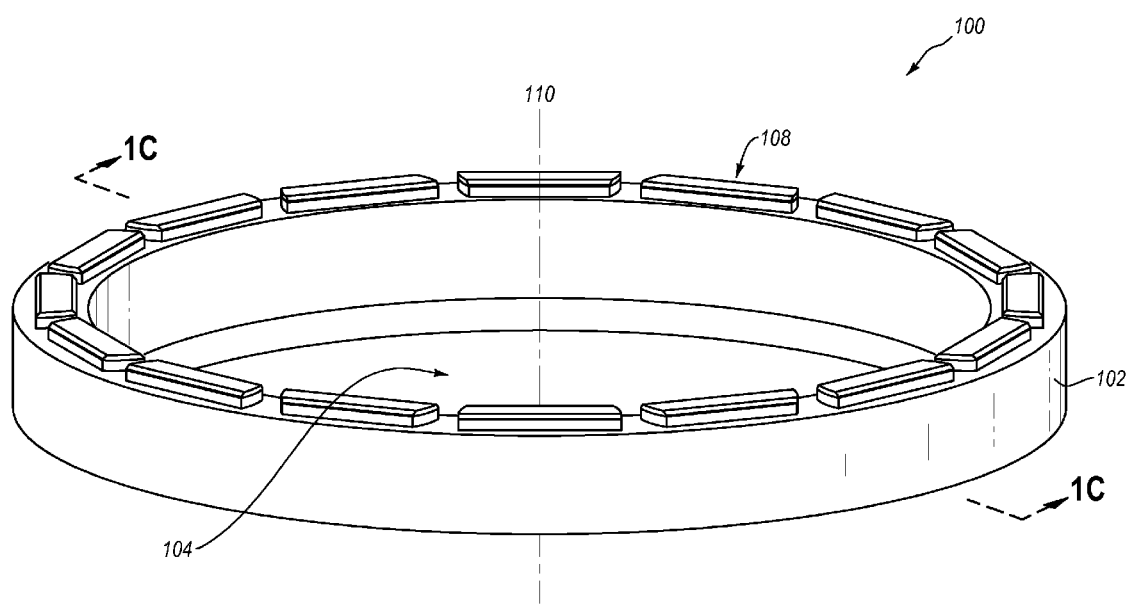
FIG. 1A is an isometric view of a thrust-bearing assembly according to an embodiment.
Figure 1B:
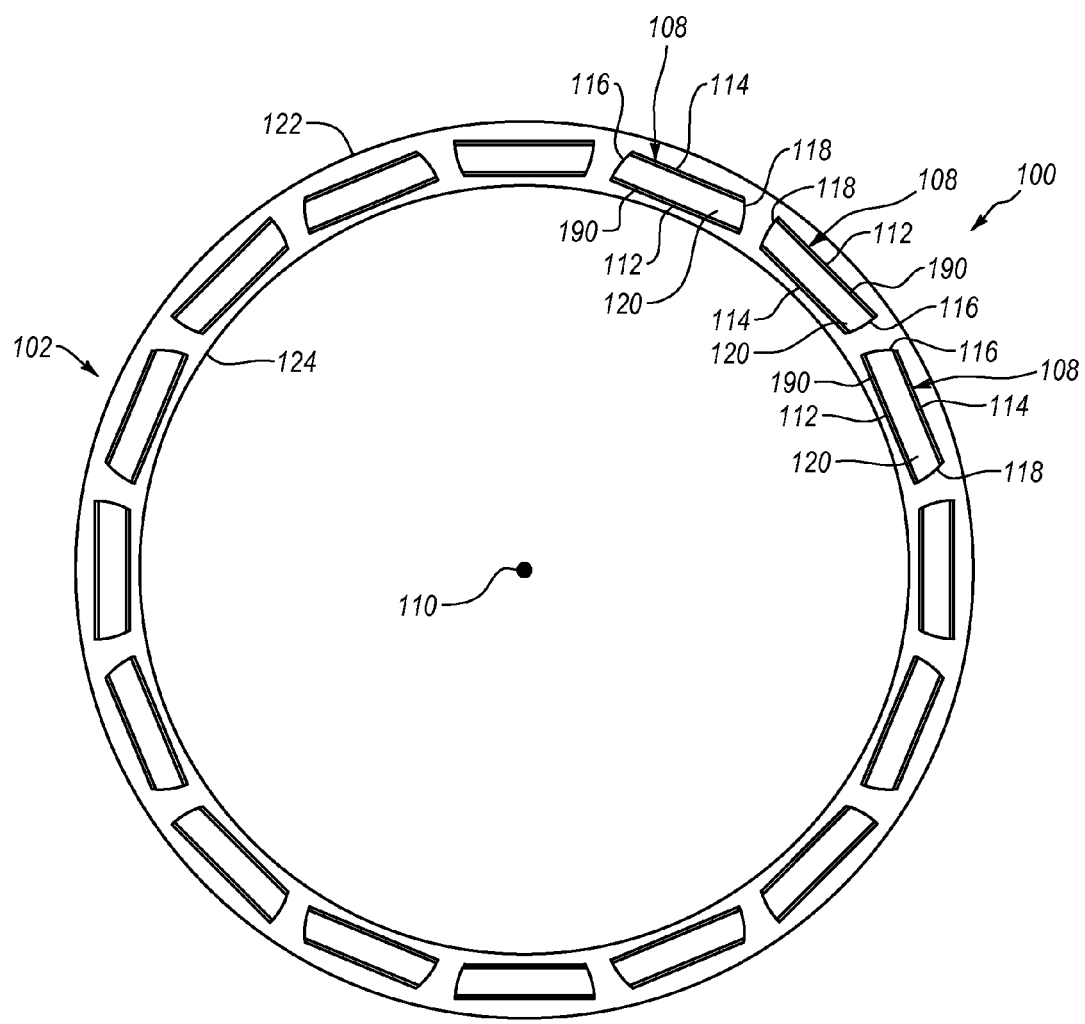
FIG. 1B is a top plan view of the thrust-bearing assembly shown in FIG. 1A.
Figure 1C:
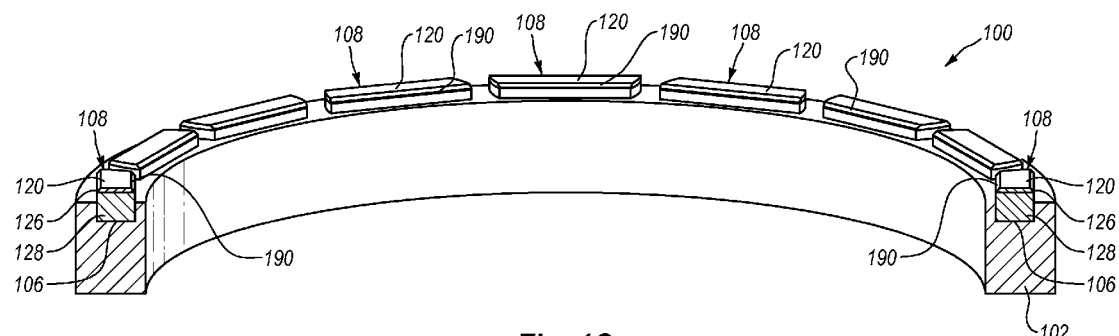
FIG. 1C is an isometric cutaway view taken along line 1C-1C of the thrust-bearing assembly shown in FIG. 1A.

FIGS. 1A-1C are isometric, top plan, and isometric cutaway views of a thrust-bearing assembly 100 according to an embodiment. The thrust-bearing assembly 100 may form a stator or a rotor of a thrust-bearing apparatus used in a subterranean drilling system. The thrust-bearing assembly 100 includes a support ring 102 defining an opening 104 through which a shaft (not shown) of, for example, a down-hole drilling motor may extend. The support ring 102 may be made from a variety of different materials. For example, the support ring 102 may comprise carbon steel, stainless steel, tungsten carbide, or another suitable material. The support ring 102 may include a plurality of recesses 106 (FIG. 1C) formed therein.

The thrust-bearing assembly 100 further includes a plurality of superhard bearing elements 108 that are generally non-cylindrical in shape. The superhard bearing elements 108 are illustrated in FIG. 1A being distributed circumferentially about a thrust axis 110 along which a thrust force may be generally directed during use. Each superhard bearing element 108 may be partially disposed in a corresponding one of the recesses 106 (FIG. 1C) of the support ring 102 and secured partially therein via brazing, press-fitting, fastening with a fastener, or another suitable technique. As used herein, a superhard bearing element is a bearing element including a bearing surface that is made from a material exhibiting a hardness that is at least as hard as tungsten carbide. The superhard bearing elements 108 may be made from a number of different superhard materials, such as polycrystalline diamond, polycrystalline cubic boron nitride, silicon carbide, tungsten carbide, or any combination of the foregoing superhard materials. In an embodiment, one or more of the superhard bearing elements 108 may include polycrystalline diamond. In some embodiments, the polycrystalline diamond may be leached to at least partially or substantially completely remove a metal-solvent catalyst (e.g., cobalt, iron, nickel, or alloys thereof) that was used to sinter precursor diamond particles that form the polycrystalline diamond to a selected depth from a bearing surface. In other embodiments, the polycrystalline diamond may be un-leached and include a metal-solvent catalyst (e.g., cobalt, iron, nickel, or alloys thereof) that was used to sinter the precursor diamond particles that form the polycrystalline diamond. In yet another embodiment (as illustrated in FIG. 1C), one or more of the superhard bearing elements 108 may be configured as a superhard compact with a superhard table 126 bonded to a substrate 128. The superhard compact may be a PDC including a cobalt-cemented tungsten carbide substrate (substrate 128) having a polycrystalline diamond table (superhard table 126) that was sintered in a first high-pressure/high-temperature process on the substrate 128 or bonded to the substrate 128 in a bonding process (e.g., a second high-pressure/high-temperature process). Suitable manufacturing techniques for fabricating polycrystalline diamond and polycrystalline diamond compacts that may be used in the disclosed embodiments are disclosed in U.S. Pat. No. 7,866,418 issued on 11 Jan. 2011, the disclosure of which is incorporated herein, in its entirety by this reference. Additionally, in any of the embodiments disclosed herein, the superhard bearing elements 108 may be substrateless and formed from a polycrystalline diamond body (that may be at least partially leached, substantially fully leached, or un-leached) or other superhard materials. Additionally, in some embodiments, the superhard table 128 may be brazed to the substrate 128 in a high-pressure/high-temperature ("HPHT") process or other non-HPHT process. For example, suitable brazing techniques are disclosed in U.S. application Ser. No. 11/545,929 filed on 10 Oct. 2006, the disclosure of which is incorporated herein, in its entirety by this reference.

In the illustrated embodiment, the superhard bearing elements 108 have a width which is substantially less than a length of the superhard bearing elements 108, although it will be appreciated that these dimensions are illustrative only and not limiting to the present disclosure. In fact, in other embodiments, the superhard bearing elements 108 may have widths substantially equivalent to their lengths or widths substantially greater than their lengths and a variety of other dimensions.

Referring to FIG. 1B, the geometry of the superhard bearing elements 108 may include a first substantially planar face 112, a second substantially planar face 114, a first end portion 116, a second end portion 118, a bearing surface 120, and a peripherally extending edge chamfer 190.

According to an embodiment, the first substantially planar face 112 and the second substantially planar face 114 may extend between the first end portion 116 and the second portion 118. In the illustrated embodiment, the first substantially planar face 112 and the second substantially planar face 114 form generally rectangular planes. The generally rectangular plane of the first substantially planar face is illustrated being larger than the generally rectangular plane of the second substantially planar face 114. However, in other embodiments, the first substantially planar face 112 may be smaller than the second substantially planar face 114. In the illustrated embodiment, the first substantially planar face 112 and the second substantially planar face 114 are substantially parallel. In other embodiments, however, the first substantially planar face 112 and the second substantially planar face 114 may be angled relative to each other. For example, the first substantially planar face 112 and the second substantially planar face 114 may be angled relative to each other such that the superhard bearing elements 108 have a wedge-like shape.

In the illustrated embodiment, the first end portion 116 and the second end portion 118 have a substantially constant curvature, thereby forming opposing arcuate ends on the superhard bearing elements 108. In other embodiments, however, the first end portion 116 and the second end portion 118 may have straight edges, non-continuous edges, or other edge configurations. For example, the first end portion 116 and the second end portion 118 may take the form of any portion of a circle, oval, square, rectangle, rhombus, triangle, or virtually any other simple, complex, regular, irregular, symmetrical, or non-symmetrical geometric shape. Moreover, the first end portion 116 and the second end portion 118 may be mirror images and have the same size and configuration, although this feature is not necessary. For example, where the first substantially planar face 112 and the second substantially planar face 114 are angled relative to each other, the first end portion 116 may have a size larger than a size of the second end portion 118 or vice versa.

The bearing surface 120 of each superhard bearing element 108 may be substantially planar and generally lie in a common plane (FIG. 1C) with the bearing surfaces 120 of the other superhard bearing elements 108. The superhard bearing elements 108 may be pre-machined to tolerances and mounted in the support ring 102 and/or mounted to the support ring 102 and the bearing surfaces 120 thereof and planarized (e.g., by lapping and/or grinding) so that the bearing surfaces 120 are all substantially coplanar. In some embodiments, one or more of the superhard bearing elements 108 may exhibit the peripherally-extending edge chamfer 190. However, in other embodiments, a portion of the peripherally-extending edge chamfer 190 or all of the peripherally-extending edge chamfer 190 may be omitted.

Referring to FIG. 1B, the geometry of the superhard bearing elements 108 is tailored for efficient positioning of the superhard bearing elements 108 on the support ring 102 and an overall bearing surface of the thrust-bearing assembly. The superhard bearing elements 108 may be circumferentially distributed about the axis 110 in an alternating pattern, with the first substantially planar face 112 of one superhard bearing element 108 facing away from the second substantially planar faces 114 of adjacent superhard bearing elements 108. In the illustrated alternating pattern, the shorter second substantially planar faces 114 of each superhard bearing element 108 may be adjacent to the longer first substantially planar faces 112 of adjacent superhard bearing elements 108 and the longer first substantially planar faces 112 of each superhard bearing element 108 may be adjacent to the shorter second substantially planar faces 114 of adjacent superhard bearing elements 108. In addition, similar curvature of the first end portion 116 of each superhard bearing element 108 and the second end portion 118 of the adjacent superhard bearing element 108 may allow for more compact positioning of the superhard bearing elements 108 about the axis 110. In other embodiments, the superhard bearing elements 108 may be circumferentially distributed about the axis 110 with two first substantially planar faces 112 facing an outer peripheral surface 122 of the support ring 102 followed by two second substantially planar faces 114 facing an inner peripheral surface 124 of the support ring 102. In yet other embodiments, the superhard bearing elements 108 may be distributed circumferentially about the axis 110 with one first substantially planar face 112 facing the outer peripheral surface 122 of the support ring 102 followed by three second substantially planar faces 114 facing the inner peripheral surface 124 of the support ring 102. The circumferentially distributed superhard bearing elements 108 may also, by way of example and not limitation, be substantially identical in size and shape, although this feature is not necessary. For example, in other embodiments, circumferentially distributed superhard bearing elements 108 may include a first longer superhard bearing element 108 followed by a shorter superhard bearing element 108 followed by the longer superhard bearing element 108 and so on. In addition, as shown best in FIG. 1C, the recesses 106 are configured and spaced in the support ring 102 such that adjacent superhard bearing elements 108 do not physically contact one another. In other embodiments, the recesses 106 on the support ring 102 may be configured and spaced such that adjacent superhard bearing elements 108 physically contact each other to form a contiguous string of the superhard bearing elements 108. In addition, the bearing surface 120 of each superhard bearing element 108 may be substantially planar and generally lie in a common plane with the bearing surfaces 120 of the other superhard bearing elements 108. FIG. 1C also illustrates the peripherally-extending edge chamfer 190 formed on the superhard table 126 of each superhard bearing element 108 according to an embodiment.

In other embodiments, a retention ring (not shown) may be configured to secure the superhard bearing elements 108 between the support ring and the retention ring as disclosed in co-pending application U.S. application Ser. No. 12/761,535 filed 16 Apr. 2010, which is incorporated herein, in its entirety, by this reference.

Figure 2:
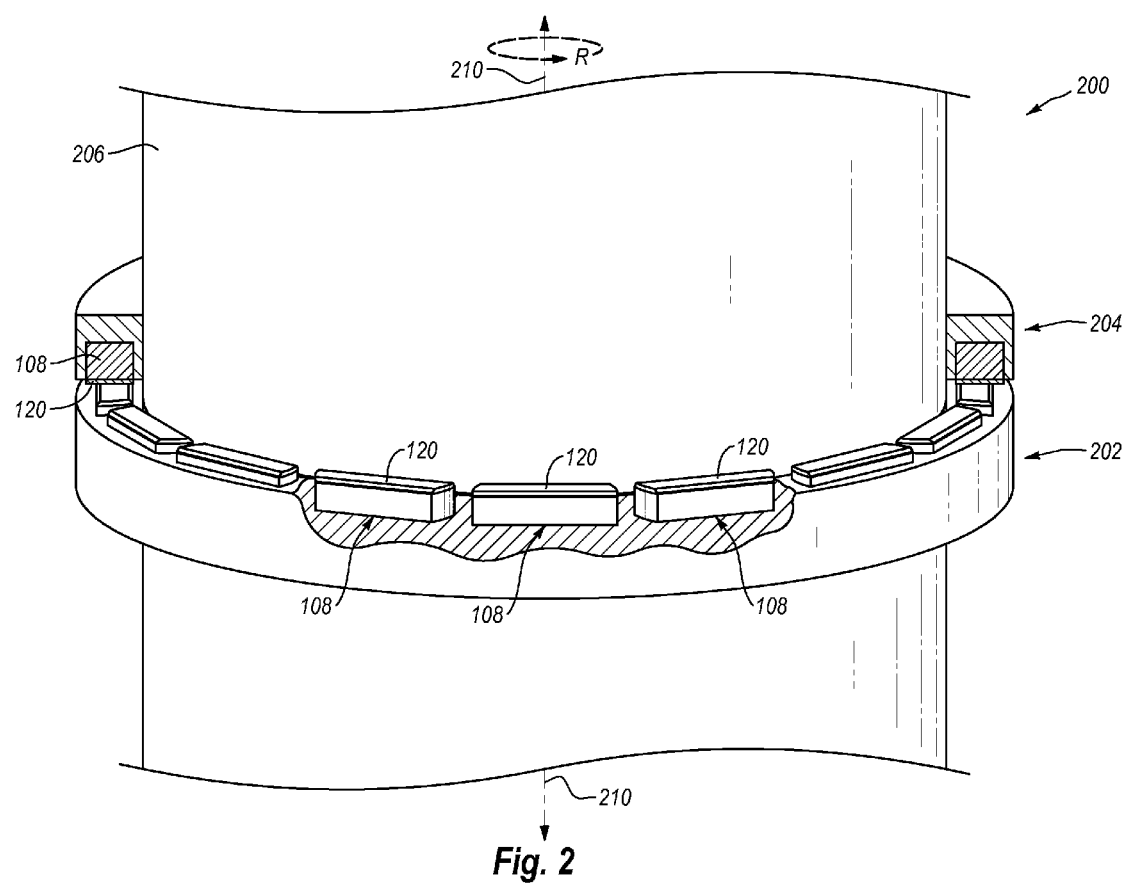
FIG. 2 is an isometric cutaway view of a thrust-bearing apparatus that may utilize any of the disclosed thrust-bearing assemblies according to an embodiment.

FIG. 2 is an isometric cutaway view of a thrust-bearing apparatus 200 that may utilize any of the disclosed thrust-bearing assemblies according to an embodiment. The thrust-bearing apparatus 200 includes a rotor 202 that may be configured as the thrust-bearing assembly 100 shown in FIGS. 1A-1C and a stator 204. The rotor 202 may be attached to and rotate with a shaft 206. The rotor 202 may be configured as the thrust-bearing assembly 100 shown in FIGS. 1A-1C, the stator 204 may be configured as the thrust-bearing assembly 100 or both the rotor 202 and the stator 204 may be configured as the thrust-bearing assembly 100.

The shaft 206 may, for example, be operably coupled to an apparatus capable of rotating the shaft 206 in a direction R (or in an opposite direction) about a rotation axis 210, such as a downhole motor. For example, the shaft 206 may extend through and may be secured to the rotor 202 by press-fitting or threadly coupling the shaft 206 of the rotor 202, or another suitable technique. The stator 204 may not be connected to the shaft 206 and, therefore, may remain stationary while the rotor 202 rotates. The respective bearing surfaces 120 of the superhard bearing elements 108 of the rotor 202 may be oriented to generally oppose and contact respective bearing surfaces 120 of the superhard bearing elements 108 of the stator 204.

Figure 3:
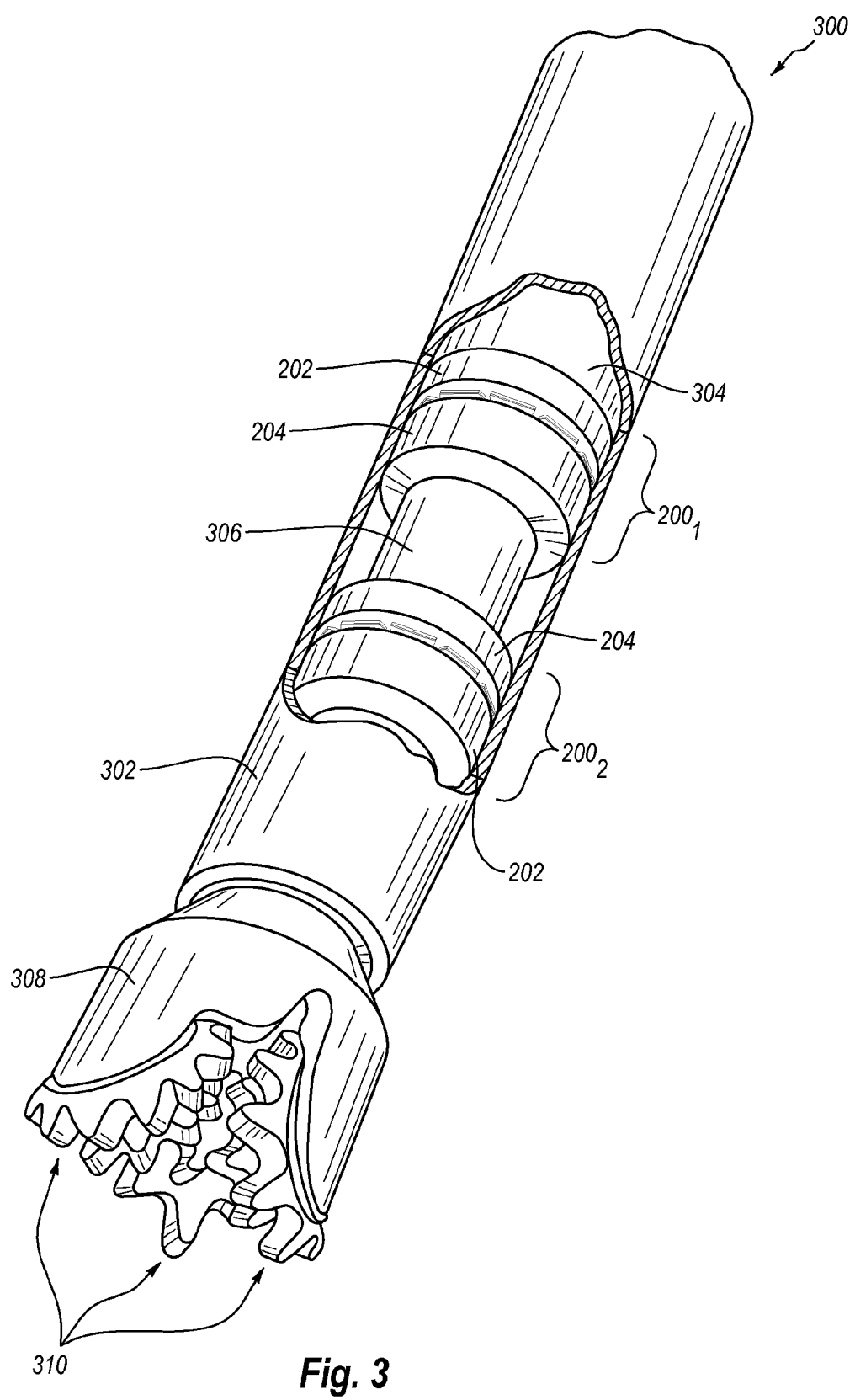
FIG. 3 is a schematic isometric cutaway view of a subterranean drilling system including thrust-bearing apparatuses utilizing any of the described bearing assemblies according to various embodiments.

Any of the embodiments of thrust-bearing apparatuses disclosed herein may be used in a subterranean drilling system. FIG. 3 is a schematic isometric cutaway view of a subterranean drilling system 300 that includes one or more of the disclosed thrust-bearing apparatuses, such as the thrust bearing apparatus 200 shown in FIG. 2. The subterranean drilling system 300 may include a housing 302 enclosing a downhole drilling motor 304 (i.e., a motor, turbine, or any other device capable of rotating an output shaft) that may be operably connected to an output shaft 306. A first thrust-bearing apparatus $200_1$ may be operably coupled to the downhole drilling motor 304. A second thrust-bearing apparatus $200_2$ may be operably coupled to the output shaft 306. A rotary drill bit 308 configured to engage a subterranean formation and drill a borehole may be connected to the output shaft 306. The rotary drill bit 308 is shown as a roller cone bit including a plurality of roller cones 310. However, other embodiments may utilize different types of rotary drill bits, such as a so-called "fixed cutter" drill bit. As the borehole is drilled with the rotary drill bit 308, pipe sections may be connected to the subterranean drilling system 300 to form a drill string capable of progressively drilling the borehole to a greater depth within the earth.

A first one of the thrust-bearing assemblies 202 of the thrust-bearing apparatus $200_1$ may be configured as a rotor that may be attached to the output shaft 306 and rotates with the output shaft 306 and a second one of the thrust-bearing assemblies 204 of the thrust-bearing apparatus $200_1$ may be configured as a stator that does not rotate. The on-bottom thrust generated when the drill bit 308 engages the bottom of the borehole may be carried, at least in part, by the first thrust-bearing apparatus $200_1$. A first one of the thrust-bearing assemblies 202 of the thrust-bearing apparatus $200_2$ may be configured as a rotor that may be attached to the output shaft 306 and rotates with the output shaft 306 and a second one of the thrust-bearing assemblies 204 of the thrust-bearing apparatus $200_2$ may be configured as a stator that does not rotate. Fluid flow through the power section of the downhole drilling motor 304 may cause what is commonly referred to as "off-bottom thrust," which may be carried, at least in part, by the second thrust-bearing apparatus $200_2$.

In operation, drilling fluid may be circulated through the downhole drilling motor 304 to generate torque and effect rotation of the output shaft 306 and the rotary drill bit 308 attached thereto so that a borehole may be drilled. A portion of the drilling fluid may also be used to lubricate opposing bearing surfaces of the bearing surfaces 120 of the thrust-bearing assemblies.

FIGS. 4A-4G are isometric views and side views at various stages during the manufacture of the superhard bearing elements 108 shown in FIGS. 1A-3 according to an embodiment. The superhard bearing elements 108 may be manufactured by electro-discharge machining ("EDM"), laser-cutting, grinding, combinations thereof, or otherwise machining a generally cylindrical insert 400 (FIG. 4A) having a predetermined height H, a top generally circular face 404, and a longitudinal axis Y. The cylindrical insert 400 may be configured as a superhard compact with a superhard table 426 bonded to a substrate 428 made from any of the previously discussed materials and/or methods. For example, the cylindrical insert 400 may be configured and fabricated as disclosed in U.S. Pat. No. 7,866,418 or U.S. application Ser. No. 11/545,929, both of which were previously incorporated by reference.

Figure 4A:
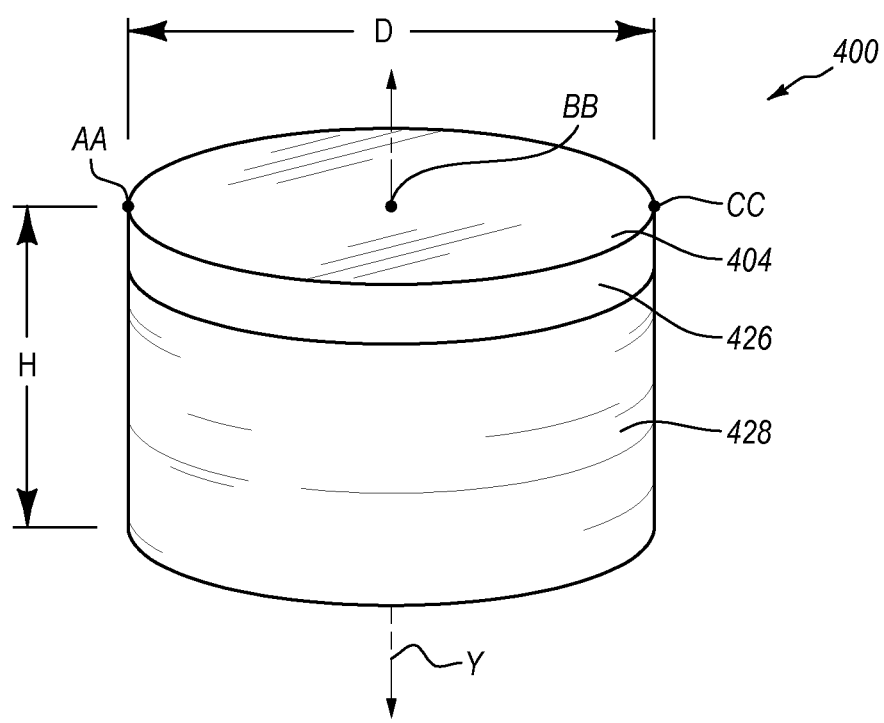
FIGS. 4A-4G are isometric views and side views at various stages during the manufacture of superhard bearing elements according to an embodiment.

As shown in FIG. 4A, the top generally circular face 404 of the cylindrical insert 400 may exhibit a diameter D having a first end point AA, a midpoint BB, and a second end point CC. In an embodiment, the method may include use of a wire electrical discharge machine that is rotatable between a cutting orientation in which the wire of the wire electrical discharge machine is substantially perpendicular relative to the top generally circular face 404 of the cylindrical insert 400, and a chamfering orientation in which the wire is at an angle "a" relative to the generally top circular face 404 of the cylindrical insert 400.

Figure 4B:
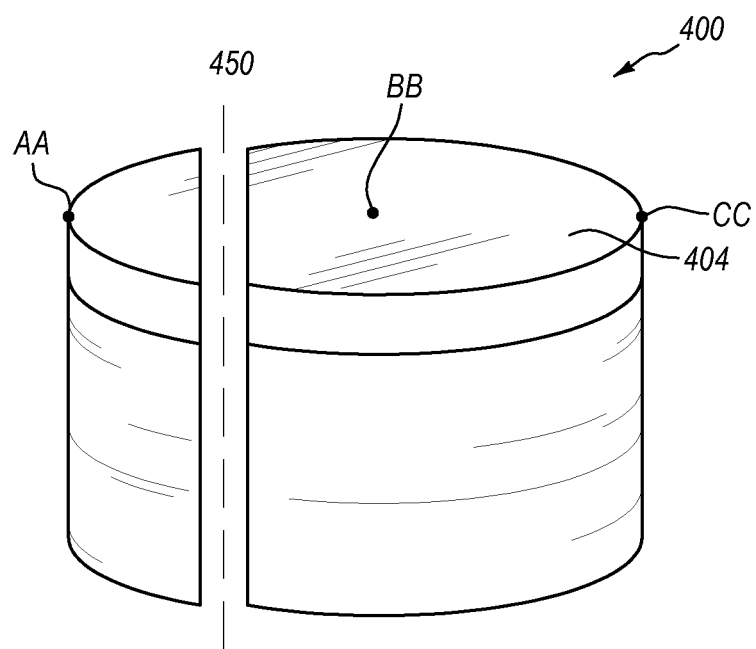
Figure 4C:
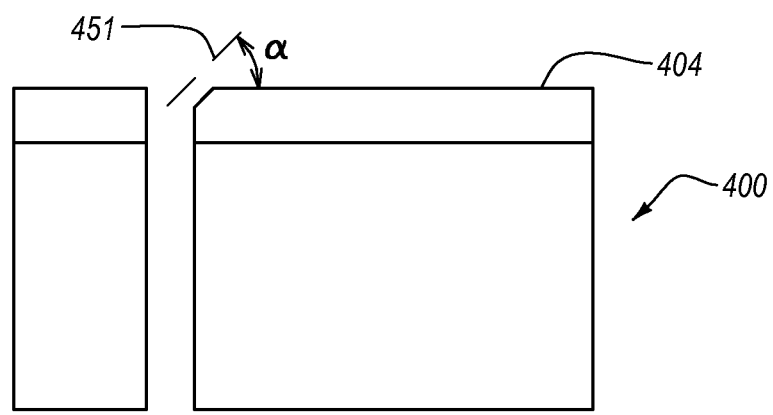

Referring now to FIG. 4B, with the wire of the wire electrical discharge machine in the cutting orientation, the method may begin by making a first straight wire EDM cut 450 through the insert 400. The first cut 450 may be made substantially parallel to the longitudinal axis Y (shown in FIG. 4A) of the cylindrical insert 400 through the top generally circular face 404 at a specified distance from the midpoint BB between the first end point AA and the midpoint BB. The wire electrical discharge machine may then be rotated to the chamfering orientation and a first chamfering pass 451 may be made to machine a peripherally-extending edge chamfer that extends along at least a portion of a first edge formed by the first cut 450 as shown in FIG. 4C.

Figure 4D:
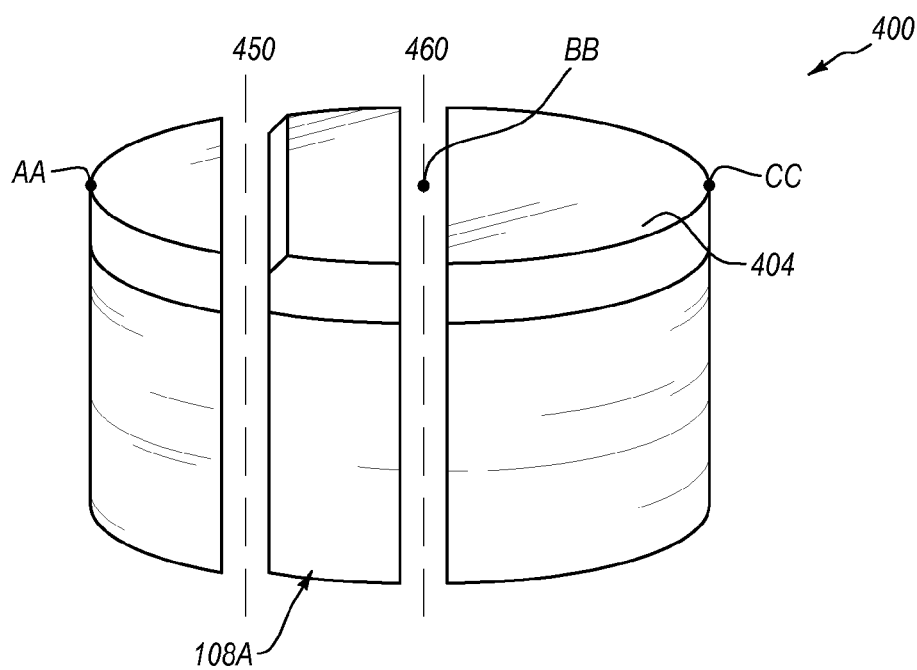
Figure 4E:
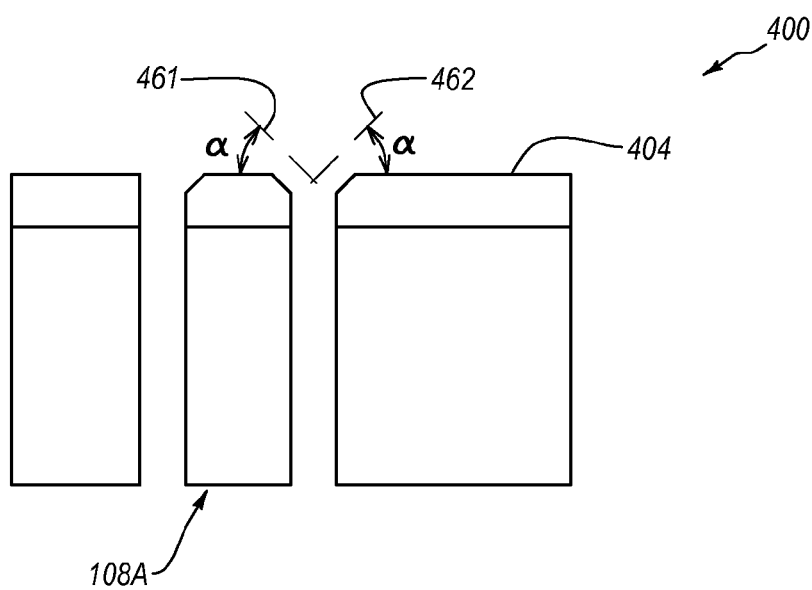

Referring to FIG. 4D, the wire of the wire electrical discharge machine may be rotated to the cutting orientation and a second straight wire EDM cut 460 may be made through the insert 400. The second cut 460 may be made through the top generally circular face 404 substantially parallel to the first cut 450 and substantially parallel to the longitudinal axis Y (shown in FIG. 4A) of the insert 400 substantially at the midpoint BB. The wire electrical discharge machine may then be rotated to the chamfering position and a second chamfering pass 461 and a third chamfering pass 462 may be made to machine peripherally-extending edge chamfers that extend along at least a portion of a second and a third edge formed by the second cut 460 as shown in FIG. 4E. A first superhard bearing element 108A may be cut from the cylindrical insert 400 by the first cut 450 and the second cut 460.

Figure 4F:
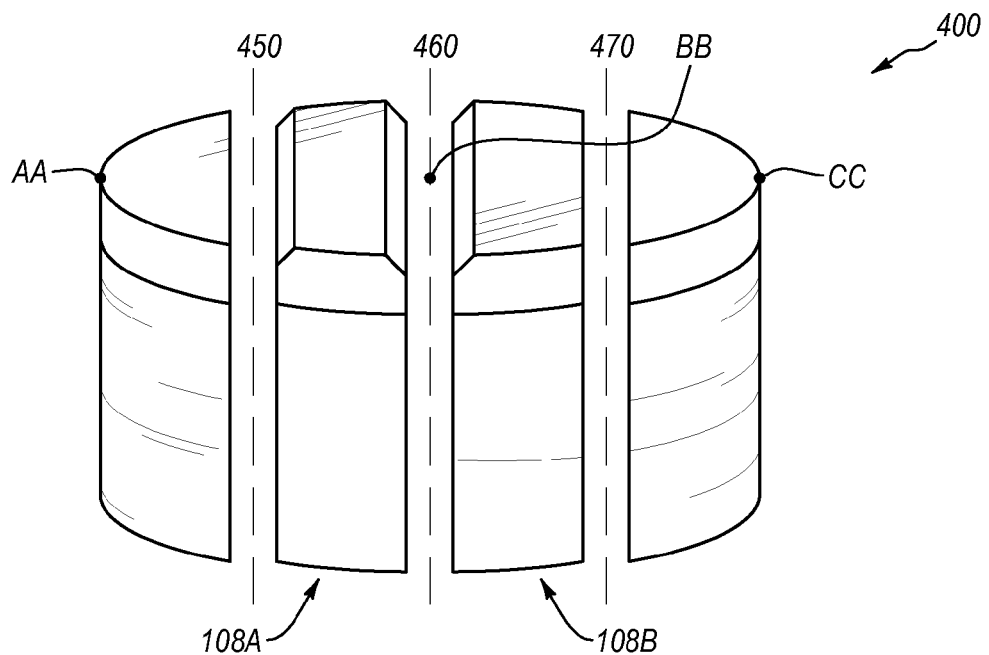
Figure 4G:
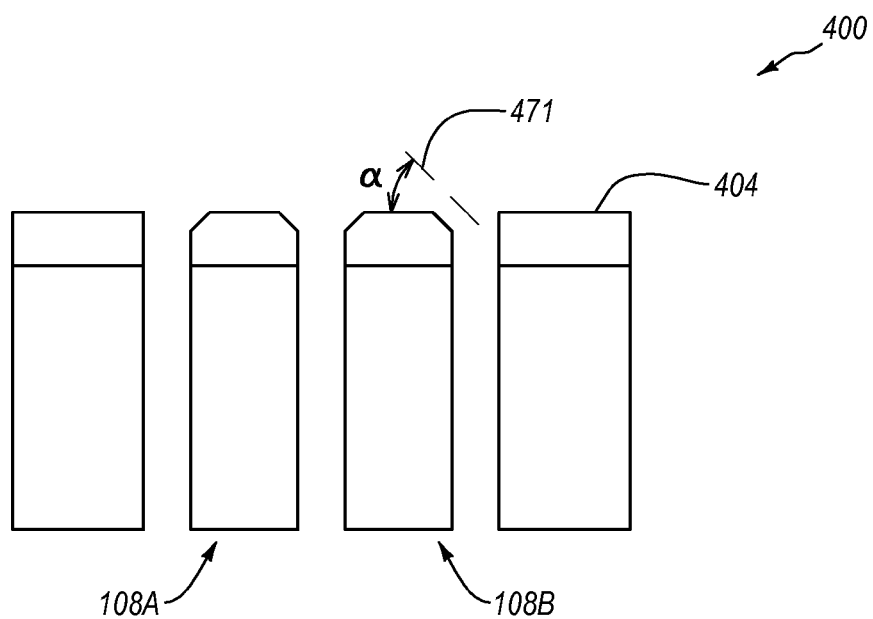

Referring now to FIG. 4F, the wire of the wire electrical discharge machine may be rotated to the cutting orientation and a third straight wire EDM cut 470 may be made through the insert 400. The third cut 470 may be made substantially parallel to the second cut 460 and substantially parallel to the longitudinal axis Y (shown in FIG. 4A) of the cylindrical insert 400 through the top generally circular face 404 at substantially the same specified distance from the midpoint BB between the second end point CC and the midpoint BB. The wire electrical discharge machine may then be rotated to the chamfering position and a fourth chamfering pass 471 may be made to machine a peripherally-extending edge chamfer that extends along at least a portion of a fourth edge formed by the third cut 470 as shown in FIG. 4G. A second superhard bearing element 108B may be cut from the cylindrical insert 400 by the second cut 460 and the third cut 470. Thus, in the illustrated method, two superhard bearing elements 108A and 108B may be cut from the same cylindrical insert 400 using a total of only three substantially straight wire EDM cuts. As shown in FIG. 4G, both the first and second superhard bearing elements 108A, 108B may include end portions formed by part of the original generally circular perimeter of the cylindrical insert 400, a first longer substantially planar face, and a second shorter substantially planar face. Because the superhard bearing elements 108A, 108B may be made from only three substantially straight wire EDM cuts and a single insert, the manufacture of superhard bearing elements may be streamlined and modestly less expensive to complete.

FIGS. 5A-5F are isometric views at various stages during the manufacture of superhard bearing elements 508 according to another embodiment. Similar to the method described in FIGS. 4A-4G, the superhard bearing elements 508A-508D may be manufactured by EDM one of the cylindrical inserts 400. In addition, peripherally-extending edge chamfers may be machined on the superhard bearing elements 508A-508D using a method similar to that described in FIG. 4A-4G. Accordingly, the peripherally-extending edge chamfers are illustrated on the superhard bearing elements 508A-508D in FIGS. 5A-5E, however, in the interest of brevity, a description of the machining of the peripherally-extending edge chamfers on the superhard bearing elements 508A-508D is not included in the method described below.

Figure 5A:
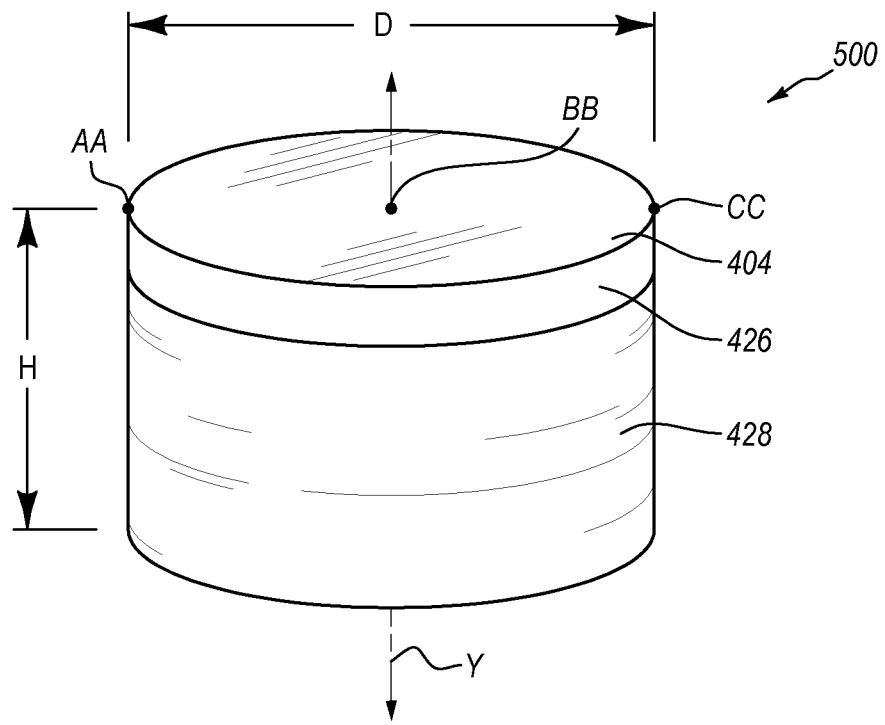
FIGS. 5A-5F are isometric views at various stages during the manufacture of superhard bearing elements according to an embodiment.
Figure 5B:
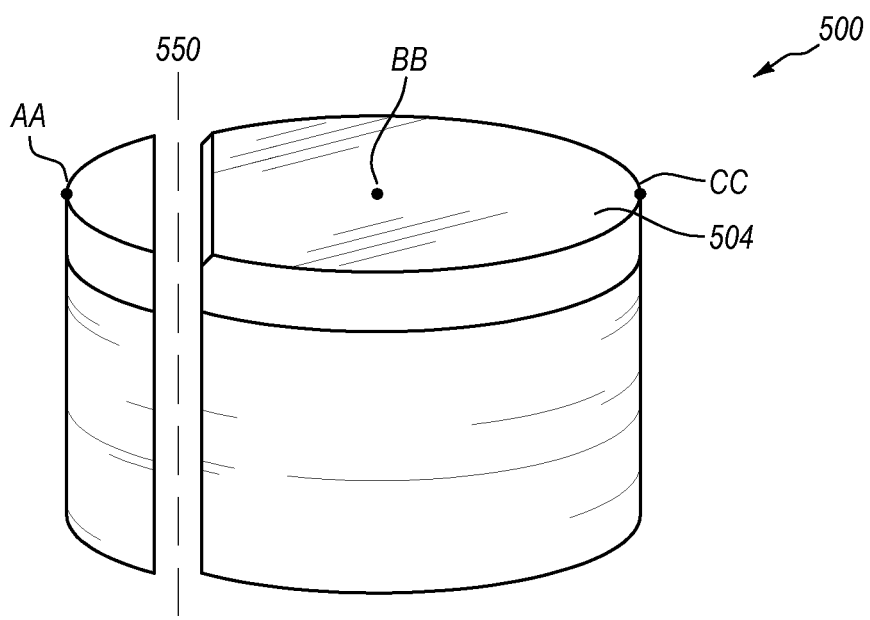
Figure 5C:
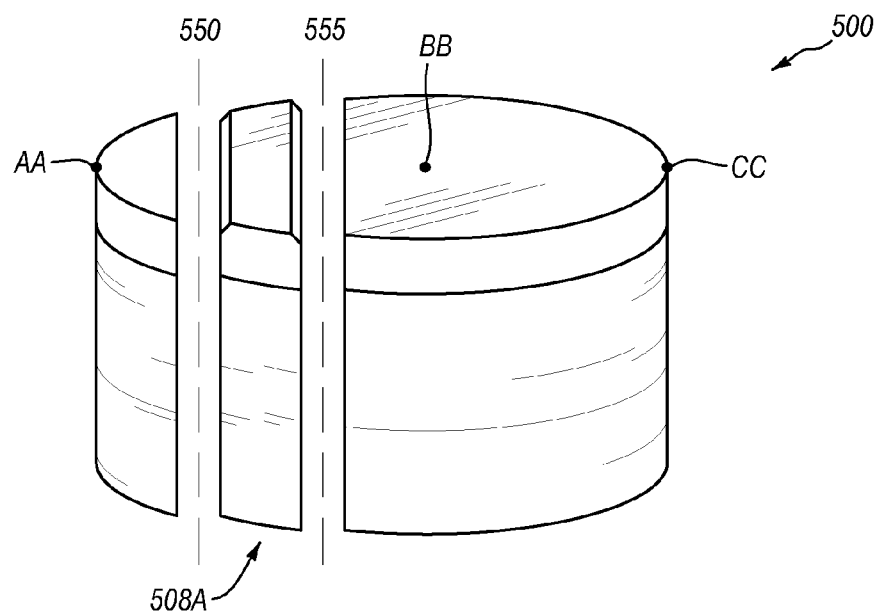
Figure 5D:
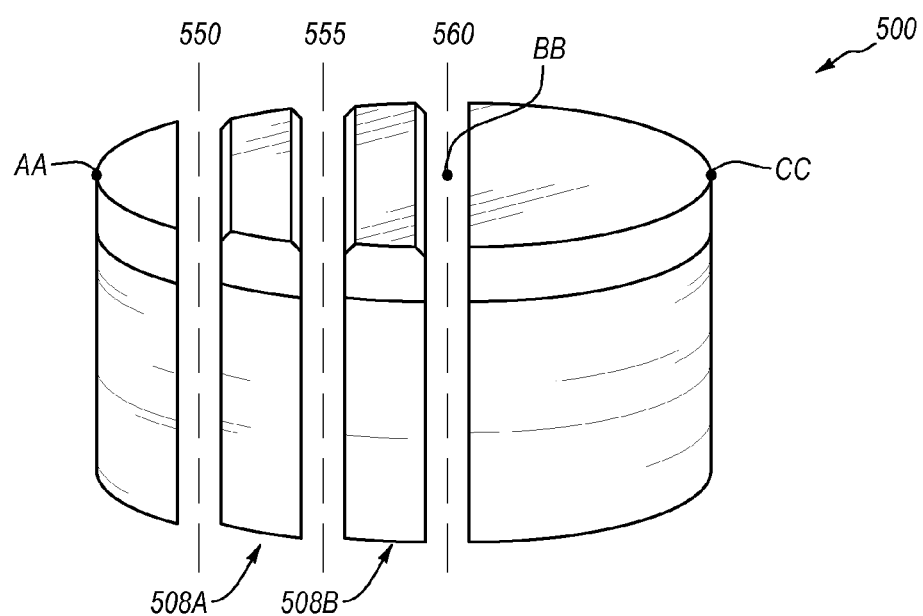
Figure 5E:
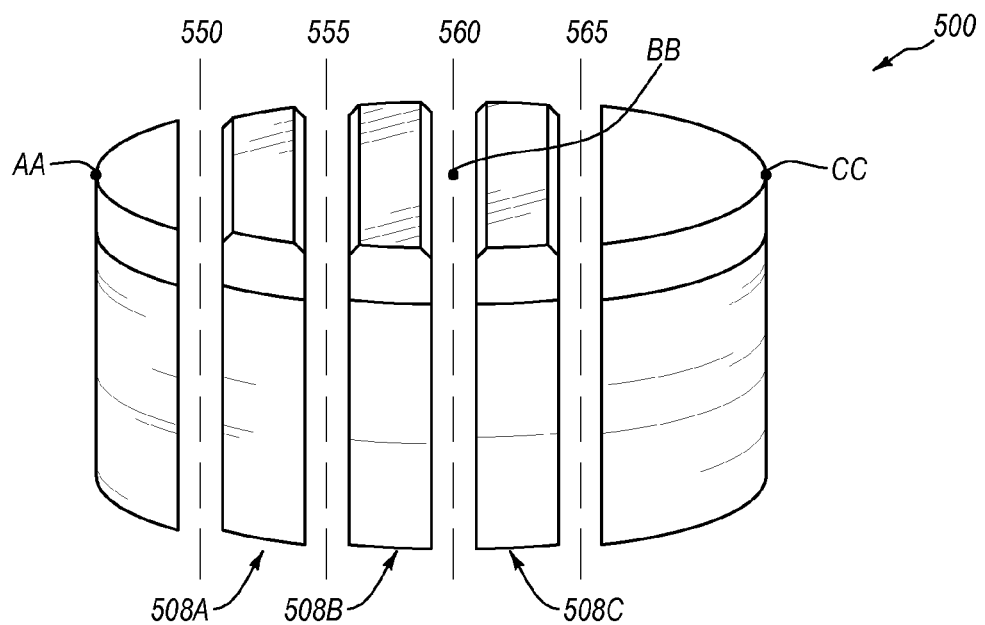
Figure 5F:
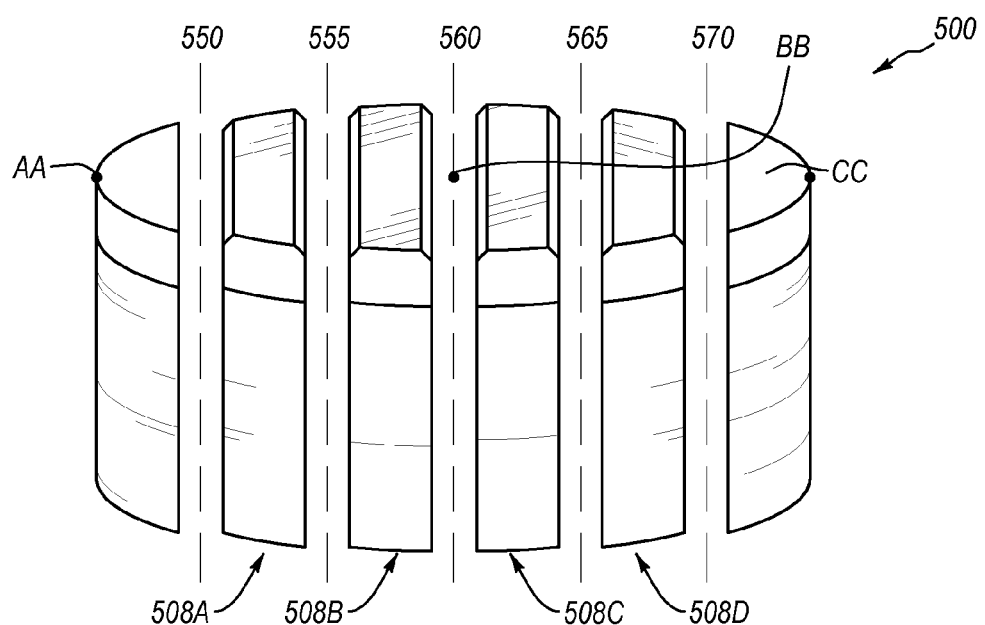

Referring now to FIGS. 5A and 5B, the method may begin by making a first substantially straight wire EDM cut 550 through the cylindrical insert 400. The first cut 550 may be made substantially parallel to the longitudinal axis Y (shown in FIG. 4A) of the cylindrical insert 400 through the top generally circular face 404 at a first specified distance from the first end point AA between the first end point AA and the midpoint BB. Referring to FIG. 5C, a second substantially straight wire EDM cut 555 may be made through the cylindrical insert 400. The second cut 555 may be made substantially parallel to the first cut 550 and substantially parallel to the longitudinal axis Y (shown in FIG. 4A) of the cylindrical insert 400 at a second specified distance from the midpoint BB between the first cut 550 and the midpoint BB. A first superhard bearing element 508A may be cut from the cylindrical insert 400 by the first cut 550 and the second cut 555. Referring to FIG. 5D, a third substantially straight wire EDM cut 560 may be made through the cylindrical insert 400. The third cut 560 may be made substantially parallel to the second cut 555 and substantially parallel to the longitudinal axis Y (shown in FIG. 4A) of the cylindrical insert 400 substantially at the midpoint BB. A second superhard bearing element 508B may be cut from the cylindrical insert 400 by the second cut 555 and the third cut 560. Referring to FIG. 5E, a fourth substantially straight wire EDM cut 565 may be made through the cylindrical insert 400. The fourth cut 565 may be made substantially parallel to the third cut 560 and substantially parallel to the longitudinal axis Y (shown in FIG. 4A) of the cylindrical insert 400 at the second specified distance from the midpoint BB between the second end point CC and the midpoint BB or the third cut 560. A third superhard bearing element 508C may be cut from the cylindrical insert 400 by the third cut 560 and the fourth cut 565. The second superhard bearing element 508B and the third superhard bearing element 508C may be substantially identical in size and configuration. Finally, as shown in FIG. 5F, a fifth substantially straight wire EDM cut 570 may be made through the cylindrical insert 400. The fifth cut 570 may be made substantially parallel to the fourth cut 565 and substantially parallel to the longitudinal axis Y (shown in FIG. 4A) of the cylindrical insert 400 at the first specified distance from the second end point CC between the second end point CC and the fourth cut 565. A fourth superhard bearing element 508D may be cut from the cylindrical insert 400 by the fourth cut 565 and the fifth cut 570. The fourth superhard bearing element 508D and the first superhard bearing element 508A may be substantially identical in size and configuration. Thus, in the illustrated method, four superhard bearing elements 508A-508D may be cut from the same cylindrical insert 400 using a total of only five straight wire EDM cuts. As shown in FIG. 5F, the superhard bearing elements 508B and 508C may be larger than the superhard bearing elements 508A and 508D, creating two separate sets of superhard bearing elements.

In other embodiments, the illustrated methods of manufacture may include grinding or machining a peripherally-extending edge chamfer that extends along at least a portion of the bearing surface of the superhard bearing elements prior to or after the formation of the individual superhard bearing elements from the cylindrical insert. In other embodiments, the creation of the peripherally-extending edge chamfer may be omitted. Moreover, while the superhard bearing elements are illustrated as being cut from a cylindrical insert, cutting the superhard bearing elements from a cubed insert, a rectangular insert, an oval-shaped insert, a triangular insert, or other shaped insert may be performed. In addition, while the straight wire EDM cuts are described as being substantially parallel to each other, in other embodiments the cuts may be made non-parallel or angled relative to each other. Further, other embodiments of the illustrated methods may also include making a straight wire EDM cuts substantially parallel to the top generally circular face 404 of the cylindrical insert 404 to vary the height of the cylindrical insert 404. However, this cut may be omitted in other embodiments.

Also, while the EDM cuts are illustrated in sequential order from left to right, the EDM cuts may be made in any sequence and may be made from any direction suitable to produce the superhard bearing elements (e.g. first cut, fourth cut, second cut, fifth cut, and then third cut). Finally, while the straight wire EDM cuts are described being made substantially parallel to the longitudinal axis Y of the cylindrical insert 400, the straight wire EDM cuts may be made substantially perpendicular or at any other angle relative to the longitudinal axis Y of the cylindrical insert 400.

Additionally, instead of employing straight wire EDM, other machining techniques may be employed in the methods described with respect to FIGS. 4A-4G and 5A-5E. For example, laser machining (e.g., laser cutting and/or ablation) or grinding may be used as an alternative to or in addition to wire EDM in the methods described with respect to FIGS. 4A-4G and 5A-5E.

Figure 6A:
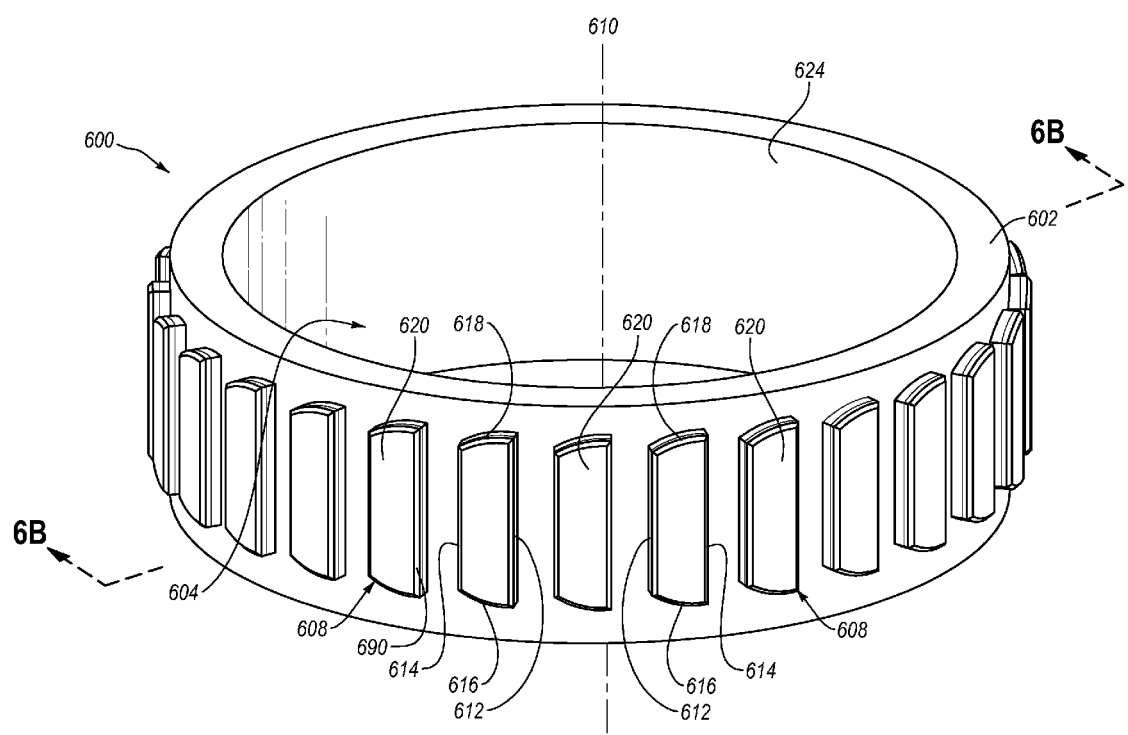
FIG. 6A is an isometric view of a radial bearing assembly according to an embodiment.
Figure 6B:
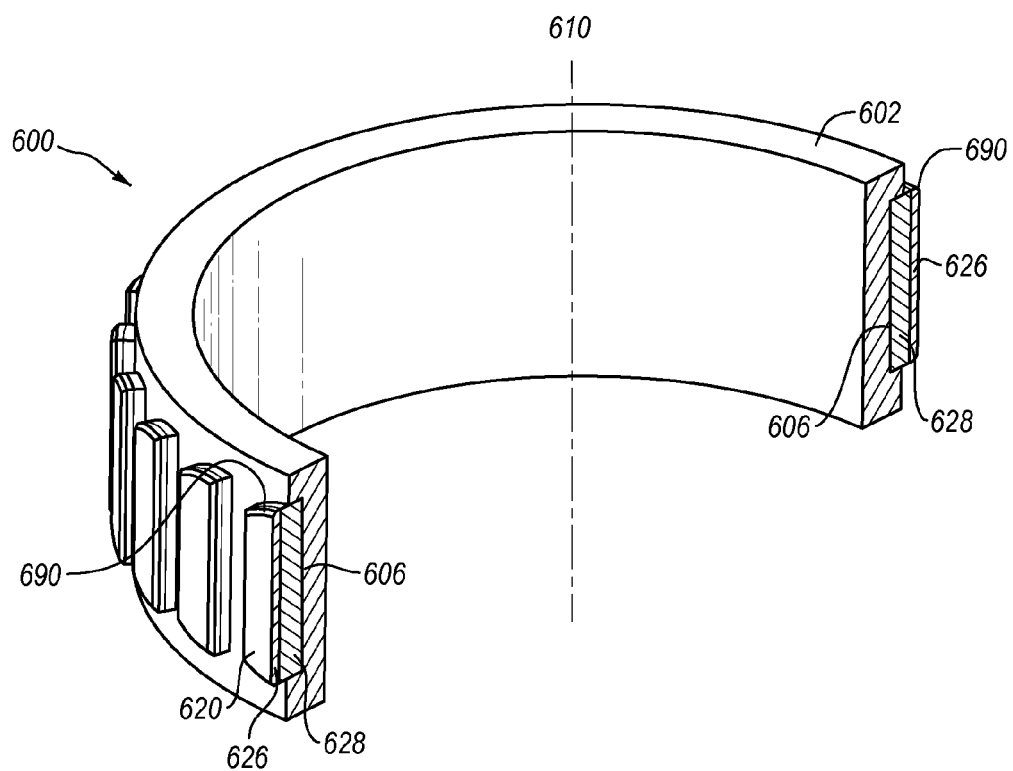
FIG. 6B is an isometric cutaway view taken along line 6B-6B of the radial bearing assembly shown in FIG. 6A.

The concepts used in the thrust-bearing assemblies and apparatuses described above may also be employed in radial bearing assemblies and apparatuses. FIGS. 6A and 6B are isometric and isometric cutaway views, respectively, illustrating a radial bearing assembly 600 according to an embodiment. The radial bearing assembly 600 may include a support ring 602 extending about a rotation axis 610. The support ring 602 may include an interior surface 624 defining an opening 604 that is capable of receiving, for example, a shaft of a motor assembly or other apparatus. A plurality of superhard bearing elements 608 may be distributed circumferentially about the rotation axis 610. As with the superhard bearing elements 108, the superhard bearing elements 608 may include a first substantially planar face 612, a second substantially planar face 614, a first end portion 616, a second end portion 618, a peripherally-extending edge chamfer 690 and may be configured as a superhard compact with a superhard table 626 bonded to a substrate 628 as shown in FIG. 6B. In addition, the superhard bearing elements 608 may include a convexly-curved bearing surface 620. Each bearing surface 620 may be convexly curved to lie on an imaginary cylindrical or spherical surface. The convexly-curved bearing surface 620 may be formed by laser machining, grinding, wire EDM cutting, a combination thereof, and/or other suitable means either before or after the superhard bearing elements 608 are secured to the support ring 602. For example, in one method of manufacturing the superhard bearing elements 608, which may be similar in many respects to the methods described in FIGS. 4A-5E, a convexly-curved surface may be wire EDM cut or ground on a superhard table 626 of a cylindrical insert before cutting the superhard bearing elements 608 from the cylindrical insert. In other embodiments, the superhard bearing elements 608 may be manufactured using methods similar to those described in FIGS. 4A-5E and then mounted (e.g., by brazing) on the support ring 602. After the superhard bearing elements 608 are mounted on the support ring 602, the convexly-curved bearing surface 620 may be ground or wire EDM cut on the superhard table 626 of each superhard bearing element 608.

Figure 6C:
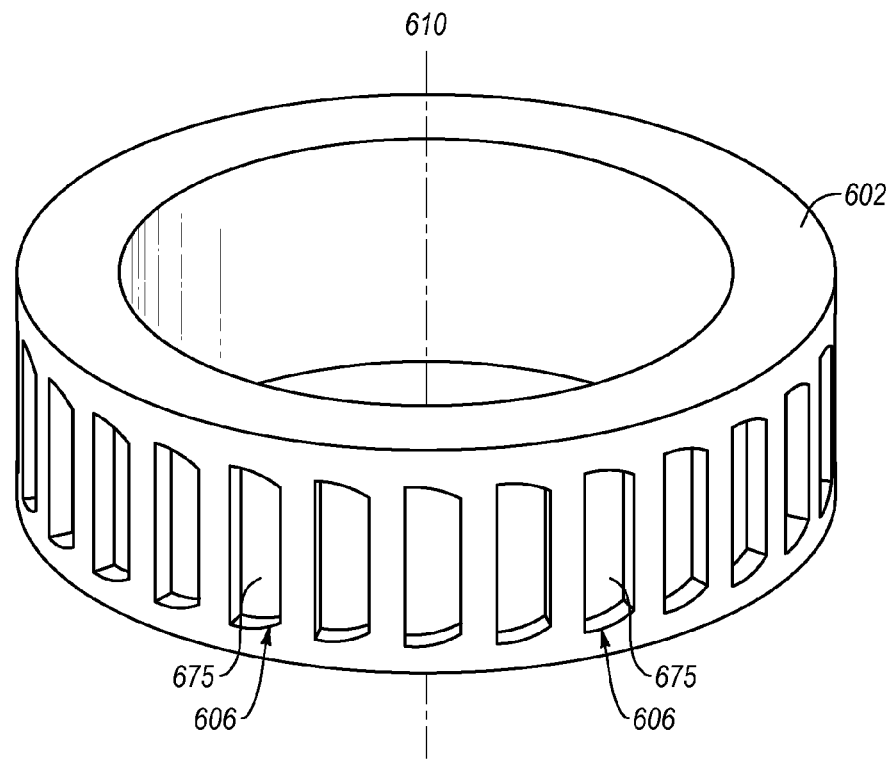
FIG. 6C is an isometric view of the support ring shown in FIGS. 6A and 6B according to an embodiment.

FIG. 6C is an isometric view of the support ring 602 that shows the configuration thereof in more detail. The support ring 602 may include circumferentially distributed recesses 606 partially defined by generally planar surfaces 675. The superhard bearing elements 608 may be secured within the recesses 606 by brazing, press-fitting, using fasteners, or another suitable technique.

Figure 7A:
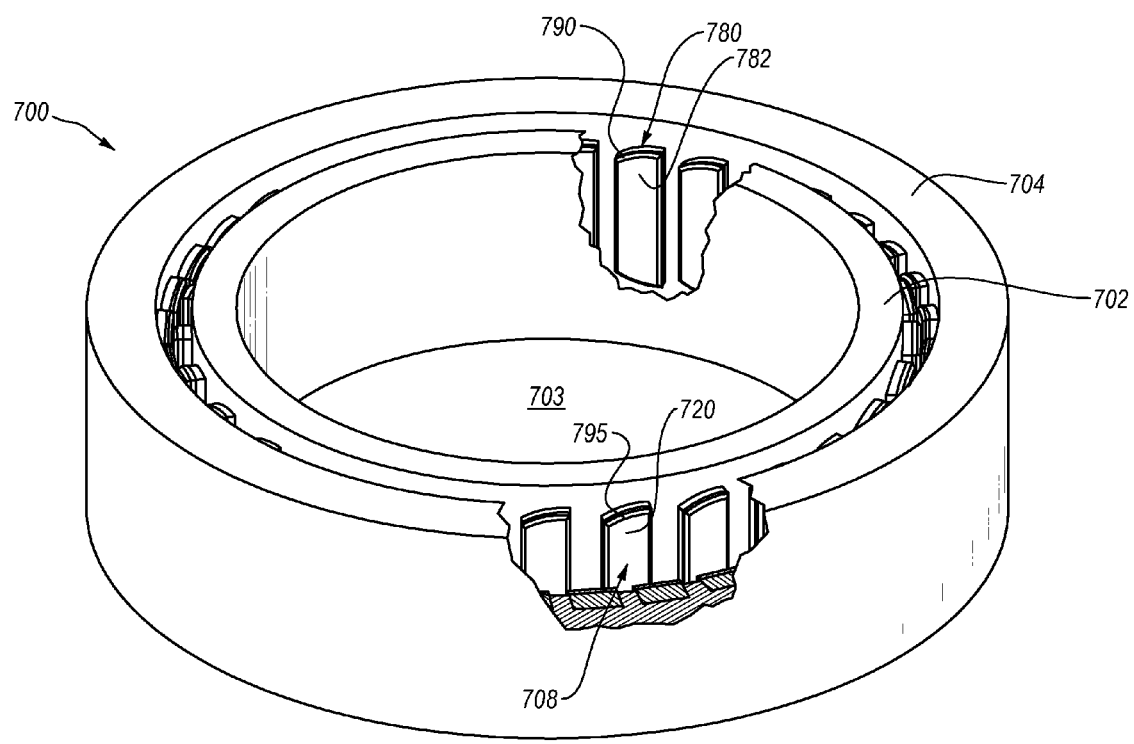
FIG. 7A is an isometric cutaway view of a radial-bearing apparatus that may utilize any of the disclosed radial bearing assemblies according to an embodiment.
Figure 7B:
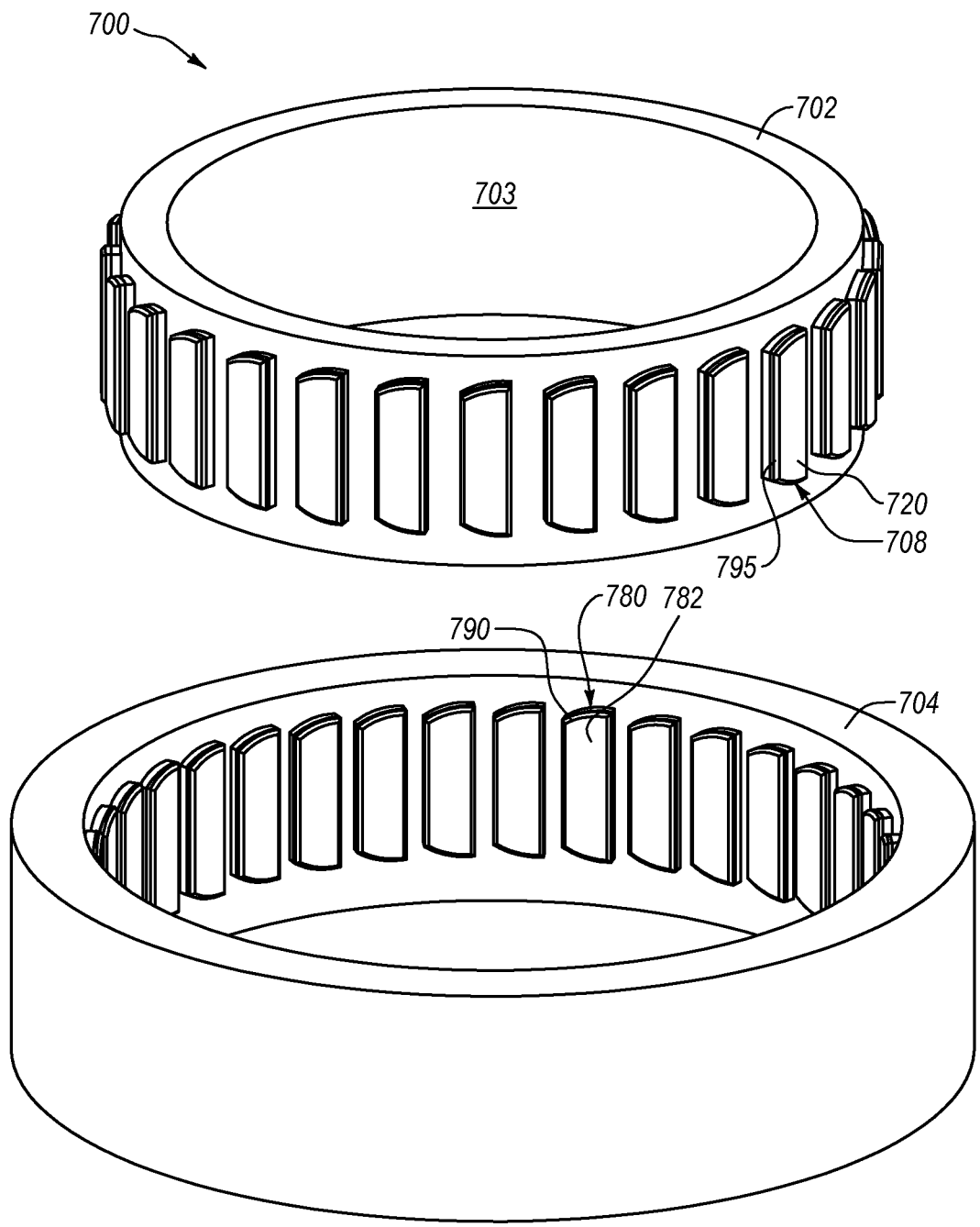
FIG. 7B is an exploded isometric view of the radial bearing apparatus shown in FIG. 7A.

FIGS. 7A and 7B are isometric cutaway and exploded isometric views, respectively, of a radial bearing apparatus 700 according to an embodiment. The radial bearing apparatus 700 may include an inner race 702 (i.e., a stator) that may be configured as the radial-bearing assembly 600 shown in FIG. 6A. The inner race 702 may define an opening 703 and may include a plurality of circumferentially distributed superhard bearing elements 708, each of which includes a convexly-curved bearing surface 720 and a peripherally-extending edge chamfer 795. The radial bearing apparatus 700 may further include an outer race 704 (i.e., a rotor) that extends about and receives the inner race 702. The outer race 704 may include a plurality of circumferentially-spaced superhard bearing elements 780, each of which may include a peripherally-extending edge chamfer 790 and a concavely-curved bearing surface 782 curved to generally correspond to the convexly-curved bearing surfaces 720 of the superhard bearing elements 708. The terms "rotor" and "stator" refer to rotating and stationary components of the radial-bearing apparatus 700, respectively. Thus, if the outer race 704 is configured to remain stationary, the outer race 704 may be referred to as the stator and the inner race 702 may be referred to as the rotor.

The radial bearing apparatus 700 may be employed in a variety of mechanical applications including motors, turbines, or any other device capable of rotating a shaft. For example, so-called "roller cone" rotary drill bits may benefit from a radial bearing apparatus disclosed herein. More specifically, the inner race 702 may be mounted or affixed to a spindle or a roller cone and the outer race 704 may be affixed to an inner bore formed within a cone and that such the outer race 704 and the inner race 702 may be assembled to form a radial bearing apparatus.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall have the same meaning as the word "comprising" and variants thereof (e.g., "comprise" and "comprises").

What is claimed is:

1. A bearing assembly, comprising:
   a plurality of superhard bearing elements distributed circumferentially about an axis, at least one of the plurality of superhard bearing elements including:
      a first arcuate end portion generally defining part of a cylindrical surface;
      a second arcuate end portion generally opposite the first end portion and generally defining part of the cylindrical surface;
      a first substantially planar face extending between the first arcuate end portion and the second arcuate end portion;
      a second substantially planar face generally opposite the first substantially planar face, the first substantially planar face having a length greater than a length of the second substantially planar face; and
      a bearing surface extending between the first arcuate end portion, the second arcuate end portion, the first substantially planar face, and the second substantially planar face; and
   a support ring that carries the plurality of superhard bearing elements.

2. The bearing assembly of claim 1 wherein each of the at least one of the plurality of superhard bearing elements comprises a peripherally-extending edge chamfer extending at least partially along the bearing surface.

3. The bearing assembly of claim 1 wherein the at least one of the plurality of superhard bearing elements comprises the plurality of superhard bearing elements.

4. The bearing assembly of claim 3 wherein the first substantially planar face of one of the at least one of the plurality of superhard bearing elements is adjacent the second substantially face of an adjacent one of at least one of the plurality of superhard bearing elements.

5. The bearing assembly of claim 1 wherein the first arcuate end and the second arcuate end are substantially symmetrical.

6. The bearing assembly of claim 3 wherein the bearing surface of the at least one of the plurality of superhard bearing elements forms a substantially planar bearing surface.

7. The bearing assembly of claim 1 wherein the axis is a thrust axis, and wherein the support ring and the plurality of superhard bearing elements define a thrust-bearing assembly.

8. The bearing assembly of claim 1 wherein the at least one of the plurality of superhard bearing elements comprises a substrate and a superhard table bonded to the substrate.

9. The bearing assembly of claim 8 wherein the superhard table comprises polycrystalline diamond.

10. The bearing assembly of claim 1 wherein the at least one of the plurality of superhard bearing elements is brazed, interference-fitted, or fastened to the support ring.

11. The bearing assembly of claim 1 wherein the at least one of the plurality of superhard bearing elements exhibits a geometry defined by a right cylinder intersected by the first and second substantially planar faces, wherein the first and second substantially planar faces are substantially parallel to a longitudinal axis of the right cylinder.

12. A bearing apparatus, comprising:
   a first bearing assembly including a first plurality of superhard bearing elements, at least one of the first plurality of superhard bearing elements having:
      a first arcuate end portion generally defining part of a cylindrical surface;
      a second arcuate end portion generally opposite the first arcuate end portion and generally defining part of the cylindrical surface;
      a first substantially planar face extending between the first arcuate end portion and the second arcuate end portion;
      a second substantially planar face generally opposite the first substantially planar face, the first substantially planar face having a length greater than a length of the second substantially planar face; and
      a first bearing surface extending between the first arcuate end portion, the second arcuate end portion, the first substantially planar face, and the second substantially planar face; and
   a first support ring that carries the first plurality of superhard bearing elements; and
   a second bearing assembly including a second plurality of superhard bearing elements generally opposed the first plurality of superhard bearing elements of the first bearing assembly;
   and a second support ring that carries the second plurality of superhard bearing elements.

13. The bearing apparatus of claim 12 wherein the first bearing assembly is configured as a stator, and the second bearing assembly is configured as a rotor.

* * * * *